(No Model.) 3 Sheets—Sheet 1.
A. SCHÖNEMANN.
APPARATUS FOR KILLING POULTRY.
No. 433,151. Patented July 29, 1890.
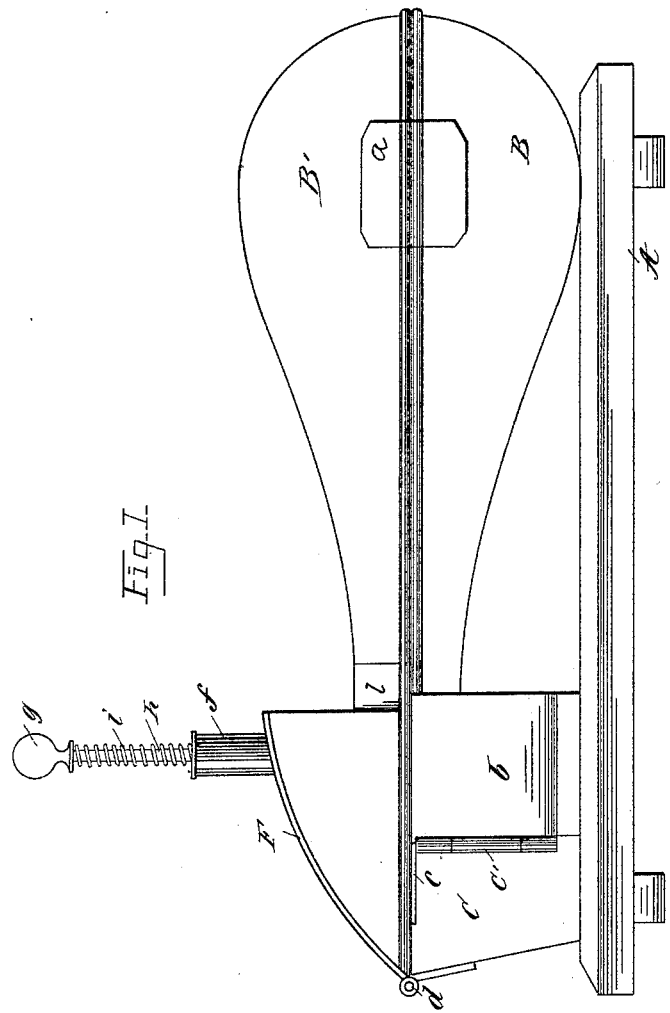
Witnesses:
Henry Huber
Inventor
August Schönemann
by
Attorneys.

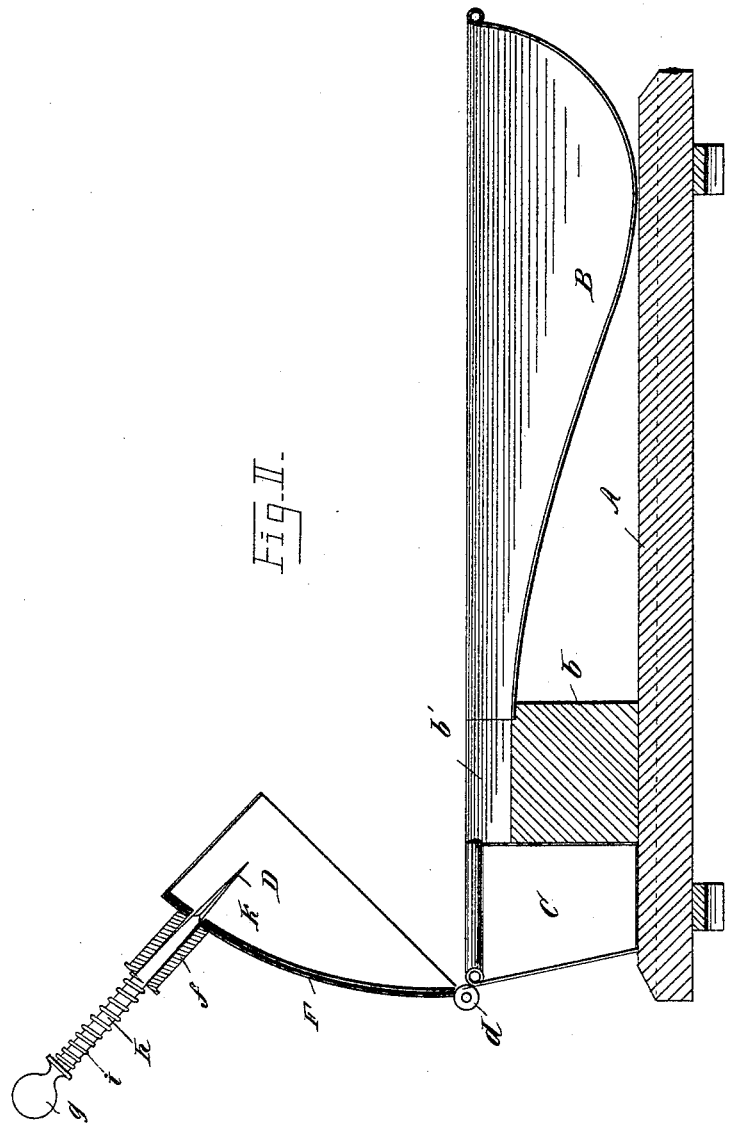

(No Model.) 3 Sheets—Sheet 3.
A. SCHÖNEMANN.
APPARATUS FOR KILLING POULTRY.
No. 433,151. Patented July 29, 1890.
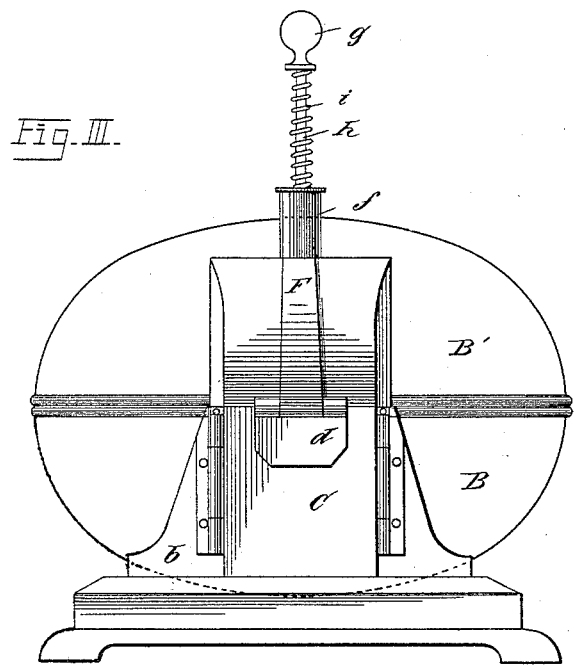
Fig. III.
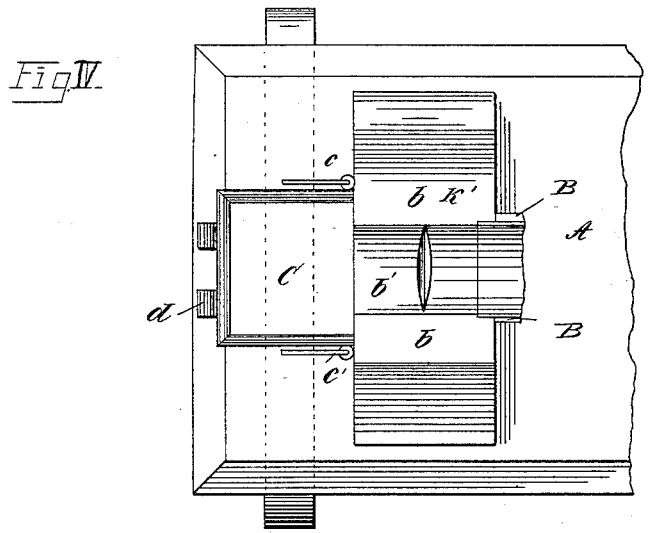
Fig. IV.

UNITED STATES PATENT OFFICE.

AUGUST SCHÖNEMANN, OF WERNIGERODE, PRUSSIA, GERMANY.

APPARATUS FOR KILLING POULTRY.

SPECIFICATION forming part of Letters Patent No. 433,151, dated July 29, 1890.

Application filed April 10, 1890. Serial No. 347,364. (No model.)

*To all whom it may concern:*

Be it known that I, AUGUST SCHÖNEMANN, of Wernigerode, in the Kingdom of Prussia and German Empire, have invented a new and useful Apparatus for Killing Poultry, of which the following is a specification, reference being had therein to the accompanying drawings.

This invention relates to an apparatus for killing poultry.

This apparatus is intended to afford assistance to housewives in the killing of fowls, many of whom are very unskilled in such an operation, while others of a nervous disposition cannot sufficiently control themselves to face the sight of blood. The fowl to be killed is placed in a net, which is drawn together over the neck of the bird, which is laid in a metallic pan or receptacle in such a manner that the said neck rests upon a wooden ledge placed in front thereof. This done, a cap, cover, or hood is placed over the head and neck of the bird, and by striking with the flat part of the hand upon a knife arranged in the said cap and held up by a spiral spring the head of the bird is separated from the body, while the blood is received in a reservoir arranged in front of the ledge.

The improved apparatus is shown in the accompanying drawings, in which—

Figure 1 is a side view of the complete apparatus. Fig. 2 is a longitudinal section of the same with the cap or hood raised. Fig. 3 is a back view of the apparatus. Fig. 4 is an upper view of the ledge, the cap being removed.

The apparatus is mounted upon the base-plate A, and consists of a pan B, which is preferably made of copper or other suitable metal, and upon this peculiar pan there is arranged a lid B', movable upon the hinge $a$, so as to be shut down when required upon the said pan B, which is firmly fixed upon the base A. The smaller or front part of the pan rests upon the ledge $b$, which is furnished with a cylindrical opening, for the purpose of serving as a rest at $b'$, Fig. 2, for the necks of fowls intended to be killed. The receptacle C is secured to the ledge $b$ by means of the angle-wires $c$, and the cap or hood D is arranged to move freely upon hinges $d$, fixed at the back of the receptacle C, so that the said cap or hood D may be shut down upon the latter, or be raised up, as desired.

F is a strengthening bar or band which extends from the hinge $d$, Figs. 1 and 3, over the whole of the cap, cover, or hood D, and serves as a support for a tube $f$, in which moves the rod $h$, furnished with a knob $g$. The rod $h$ is surrounded at its upper end with a spiral spring $i$, which bears at one end against the knob $g$, and on the other against the cap of the tube $f$. The lower end of the rod $h$ terminates in a sharp heart-shaped knife $k$, which, by the act of striking and pressing the knob $g$, severs the fowl's head from its body. After the pressure caused by the blow has ceased the spring $i$ brings the rod, with the knife, back into its normal position.

In order to take up the knife after the blow and prevent the same from wearing, the ledge $b'$ is provided with a notch $k'$.

For the purpose of obtaining more perfect impermeability, and of preventing the blood spurting out the front and small part of the pan, lid B' is surrounded with a small strip or band of india-rubber or leather $l$.

The operation of the apparatus is as follows: The fowl is placed, as already stated, in a net, which is tied round its neck, and the bird is then placed in the pan B, whereupon the lid B' is closed and secured with a pin or peg. The previously-drawn-back hood D is shut down over the neck of the bird, now resting in the recess $b'$, and the knob $g$, Fig. 1, is struck with the hand, whereupon the head is forthwith severed from the body of the fowl and falls into the receptacle C, whereinto the blood also runs subsequently and until the bird is bled out. After the fowl is removed the vessel C, which can be moved up and down in the tubular sheath $c'$ by means of the angle-wires $c$, is withdrawn and cleaned.

What I claim, and desire to secure by Letters Patent of the United States, is—

The combination of the pan B, the lid B', hinged thereto, the recessed ledge $b$, the receptacle C, the hood D, the bar $h$, the knife $k$, the knob $g$, and the spring $i$, substantially as set forth.

In witness whereof I have hereunto set my hand in presence of two witnesses.

AUGUST SCHÖNEMANN.

Witnesses:
PAUL FISCHER,
WILHELM SCHRVISTHAL.